(12) United States Patent
Connery et al.

(10) Patent No.: US 8,565,318 B2
(45) Date of Patent: Oct. 22, 2013

(54) RESTAMPING TRANSPORT STREAMS TO AVOID VERTICAL ROLLS

(75) Inventors: Glenn Connery, Petaluma, CA (US); Andrew Palfreyman, San Jose, CA (US); William Sherer, Danville, CA (US); Hoi-Tauw Chou, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 1383 days.

(21) Appl. No.: 12/022,099

(22) Filed: Jan. 29, 2008

(65) Prior Publication Data
US 2009/0193454 A1 Jul. 30, 2009

(51) Int. Cl.
*H04N 7/12* (2006.01)

(52) U.S. Cl.
USPC ............. 375/240.25; 375/240.01; 375/240.28

(58) Field of Classification Search
USPC ............................................. 375/240–240.29
See application file for complete search history.

(56) References Cited

U.S. PATENT DOCUMENTS

| | | | |
|---|---|---|---|
| 6,115,422 A | 9/2000 | Anderson et al. | |
| 7,096,481 B1 | 8/2006 | Forecast et al. | |
| 7,197,088 B1 * | 3/2007 | Yukawa | 375/316 |
| 7,502,368 B2 * | 3/2009 | Sanders et al. | 370/389 |
| 7,570,304 B1 * | 8/2009 | Trinh et al. | 348/512 |
| 2001/0036355 A1 * | 11/2001 | Kelly et al. | 386/52 |
| 2003/0137601 A1 * | 7/2003 | Chen et al. | 348/446 |
| 2004/0218093 A1 * | 11/2004 | Radha et al. | 348/384.1 |
| 2009/0180534 A1 * | 7/2009 | Hluchyj et al. | 375/240.01 |

FOREIGN PATENT DOCUMENTS

EP 0881838 12/1998

OTHER PUBLICATIONS

Motorola Corporation, DCT 2000 User's Guide, 2000.
European Patent Office, "International Search Report", Jun. 29, 2009, 3 pgs.

* cited by examiner

*Primary Examiner* — Michael Thier
*Assistant Examiner* — Feben M Haile
(74) *Attorney, Agent, or Firm* — Merchant & Gould

(57) ABSTRACT

In one embodiment, a network device analyzes an encoded stream to identify a timing value included in a packet before a splice point. Next, the device determines a difference between identified timing value and a timing value included in a packet of the encoded segment to be spliced. In conjunction with splicing, the network device formats timing values of packets according to the determined difference, which improves play out of the spliced stream.

13 Claims, 5 Drawing Sheets

| List of decoders known to display a vertical roll after decoding a packet having a set discontinuity bit | Decoder model number | Decoder brand | Decoder hardware configuration |
|---|---|---|---|
| 71 | 72 | 73 | 74 |
| Decoder 1 | Model M1 | Brand B1 | Hardware config. C1 |
| Decoder 2 | Model M2 | Brand B2 | Hardware config. C2 |
| Decoder 3 | Model M3 | Brand B3 | Hardware config. C3 |

RESTAMPING TRANSPORT STREAMS TO AVOID VERTICAL ROLLS

TECHNICAL FIELD

The present disclosure relates generally to the field of networking and video.

BACKGROUND

Encoded streams can be modified at a midpoint to include new content. For example, an advertisement insertion device can splice an advertisement into a designated portion of an encoded stream. An OutPoint (OP) refers to a splice point between a packet of the encoded stream and an initial packet of the spliced segment. Similarly, an InPoint (IP) refers to a splice point between the last packet of the spliced segment and an immediately adjacent packet of the encoded stream.

When the encoded stream is decoded and displayed at an endpoint, sometimes vertical rolls are displayed after decoding packets initially following these splice points. A vertical roll is characterized by one or more displayed frames being improperly displaced upwards or downwards on the display before subsequent frames are displayed normally. For example, if the spliced stream is a National Television System Committee (NTSC) stream, a portion of the 480 scan lines of the picture are not displayed while the some of the overscan portion, e.g. the remaining 45 overscan lines, is improperly displayed. When the vertical roll does occur, the amount of displacement is seemingly random, increasing the difficulty in generating smooth splicing transitions. The disclosure that follows solves this and other problems.

BRIEF DESCRIPTION OF THE DRAWINGS

FIG. 3 illustrates an example capability table that may be used by the network device shown in FIG. 1 to select which output streams are restamped.

DESCRIPTION OF EXAMPLE EMBODIMENTS

Overview

Figure 1:
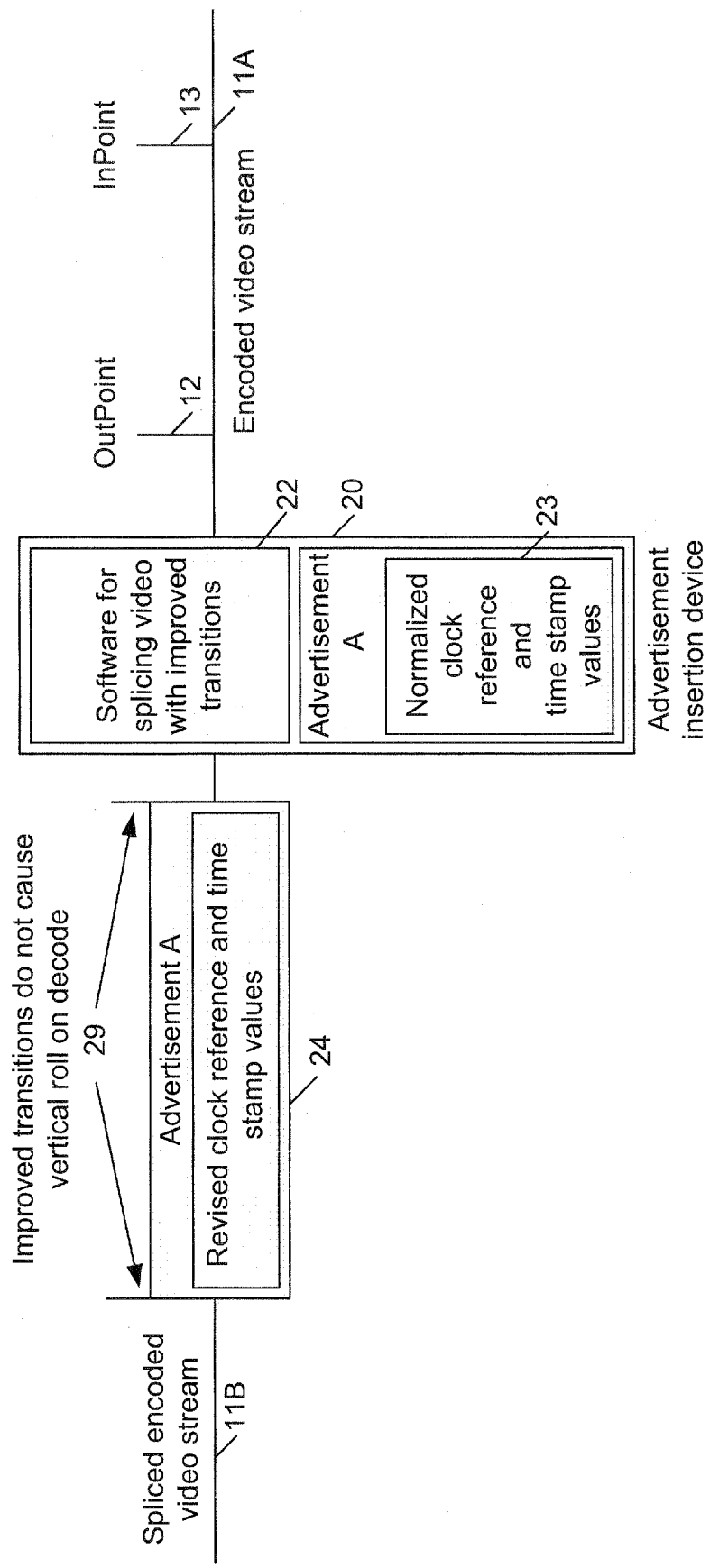
FIG. 1 illustrates a network device that splices an encoded stream for improved splicing transitions.

In one embodiment, a network device analyzes an encoded stream to identify a timing value included in a packet before a splice point. Next, the device determines a difference between identified timing value and a timing value included in a packet of the encoded segment to be spliced. In conjunction with splicing, the network device formats timing values of packets according to the determined difference, which improves play out of the spliced stream.

DESCRIPTION

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device. Only those parts of the various units are shown and described which are necessary to convey an understanding of the examples to those skilled in the art.

FIG. 1 illustrates a network device that splices an encoded stream for improved splicing transitions.

An advertisement insertion device 20 or other network device receives a transport stream 11A encoded by an encoder, such as a television network facility. The encoded transport stream 11A in the present example is a video stream that includes an advertisement availability segment having a duration bounded by an OutPoint (OP) 12 and an InPoint (IP) 13. The software 22 causes the device 20 to splice a video segment, such as locally stored advertisement segment A, into the encoded video stream 11A at the advertisement availability segment. The device 20 reformats normalized timing values 23 from the stored advertisement A such that the output stream 11B includes the revised timing values 24.

When the output stream 11B is decoded, the revised timing values 24 prevent a vertical roll from being displayed when transitioning between playing the video stream packets and the spliced packets. An explanation for how the revised timing values 24 prevent the vertical roll is provided with reference to FIGS. 2A and 2B.

Figure 2A:
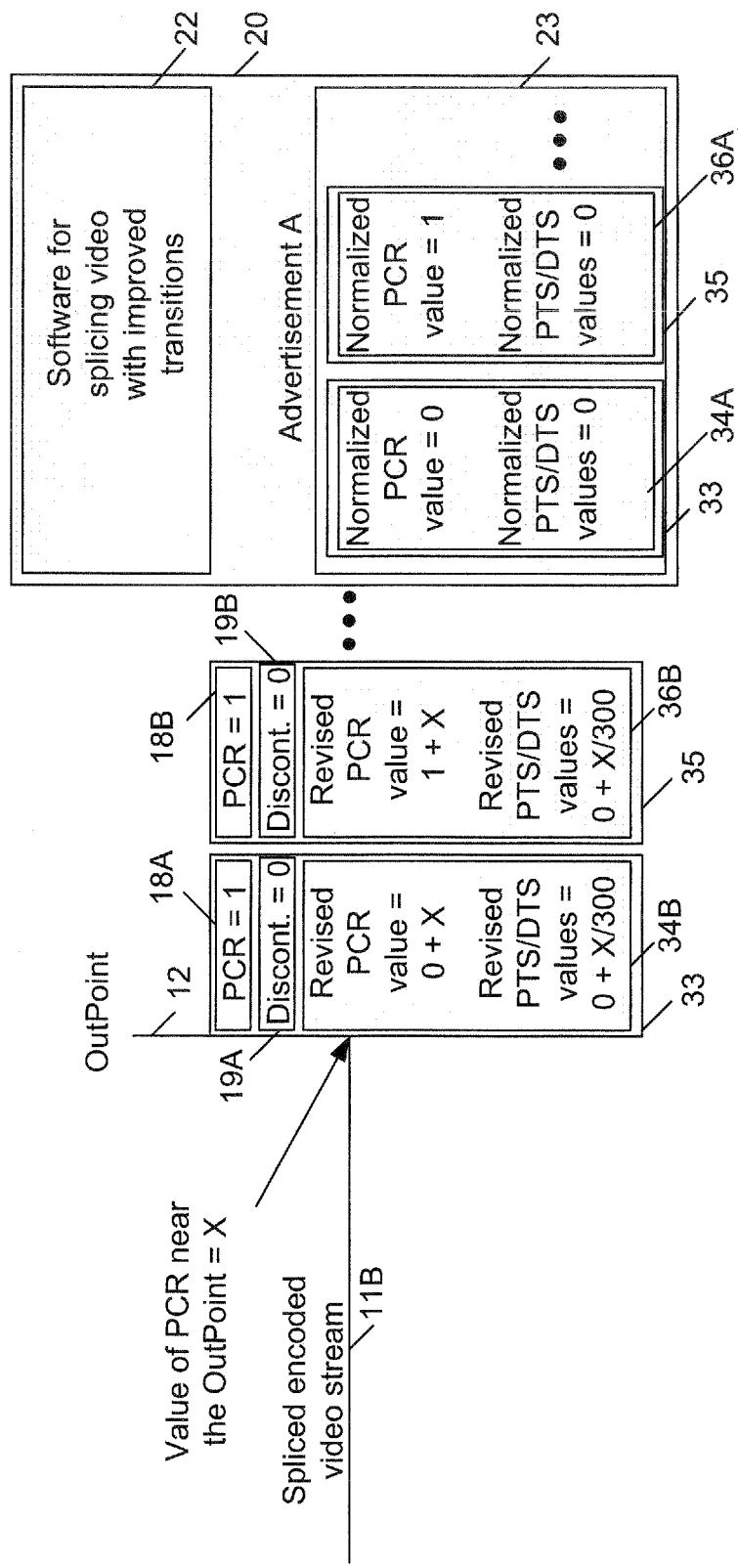
FIG. 2A illustrates one example of how the network device shown in FIG. 1 revises timing values to improve splice transitions.

FIG. 2A illustrates one example of how the network device shown in FIG. 1 revises timing values to improve splice transitions.

A Moving Picture Experts Group (MPEG) decoding process is synchronized with an encoding process as specified in the MPEG specification by way of Program Clock Reference (PCR) values included in MPEG packets. The decoder synchronizes its own clock with the PCR values included in the MPEG packets, which provides synchronization and proper playback of the content. The function of PCR values will be explained in the next few paragraphs, while the function of other timing values, such as Presentation Time Stamp (PTS) and Decode Time Stamp (DTS), will be provided later.

The PCR value is a 42 bit value containing a 33 bit "base" and a 9 bit "extension." The 9 bit extension increments according to a 27 MHz counter, and as soon as the 9 bit extension reaches 300, it resets to zero and increments the base up by one. The base, being increased every 300 counts, corresponds to a 90 KHz counter.

The PCR values are included in the transport stream at least once every 100 ms; however, MPEG packets are sent more frequently and therefore typically only a portion of MPEG packets include the PCR values. Inclusion of a PCR value in an MPEG packet is designated by setting a PCR bit in the header of the MPEG packet.

If PCR values from one packet to the next break a sequence, e.g. vary unexpectedly, the decoder slowly starts synchronizing itself to the new sequence of values. If the variance is relatively small, the decoder can synchronize to new values without disrupting playback. However, if the variance is larger, the playback can be disrupted while the decoder synchronizes to the new values, for example by displaying temporary blackness.

To address playback disruption related to a significant variance in the PCR values, the MPEG specification provides a discontinuity bit in the header of MPEG packets. Setting the discontinuity bit to one causes a decoder to conform to the new PCR value sequence without the slow adaptation, which can prevent the black display.

It has been empirically observed that particular decoders display the vertical roll upon receiving an MPEG packet having the discontinuity bit set. This may be caused by the decoders clearing internal registers upon observing the discontinuity, or for other reasons. An example of such a decoder is the Motorola DCT 2000, which has been widely distributed to consumers.

One partial solution is for the splicing device to re-encode the received encoded stream with the advertisements. However, re-encoding the received encoded stream requires high processing capabilities, which the splicing device may not have or may not have readily available.

To prevent these vertical rolls without re-encoding the received encoded stream, PCR values 34A and 36A that are encoded into the advertisement A can be revised as shown in FIG. 2A in conjunction with splicing the advertisement A into the encoded content. The software 22 receives encoded content and observes a PCR value included in a packet before the splice point, which is an imaginary point between two packets. According to the observed PCR value, the software 22 determines the PCR value X, which represents the PCR value near the OP 12. The PCR value X may be equal to either the observed PCR value or may be an inferred value expected to be included after the observed PCR included in the pre-splice point packet.

The software 22 then adjusts the timing values included in the advertisement A according to the value X. Preferably, the advertisement A is encoded with "normalized" timing values as shown in FIG. 2A. The advertisement A has normalized timing values if the advertisement A was encoded with a count beginning at zero.

In this specific example, where the timing values are MPEG timing values and the encoding timing values are normalized, the value X is added to the 42 bit PCR values of the splice packets including packets 33 and 35. Also, in this specific example, the value X is converted from a 27 MHz count to a 90 kHz count by dividing the value X by 300, and the resulting quotient is added to the Presentation Time Stamp (PTS) and Decode Time Stamp (DTS) values of the packets 33 and 35. A floor function is applied to the quotient to remove any digits after the decimal.

The device 20 updates the packets 33 and 35 with the revised timing values 34B and 36B by changing all or some of the bits of the stamped PCR, PTS and DTS values in the packets 33 and 35 of the encoded advertisement A. These bits may be changed before, after or while the advertisement A is being spliced into the received encoded video stream. Changing the bits may be performed by completely replacing the PCR, PTS and DTS with the new values.

As long as the advertisement A is long enough to fill the advertisement availability segment, the PCR count will also be continuous at the IP transition. If the advertisement A does not fill the advertisement availability segment, then it is preferable to splice in an additional segment to fill the gap. The additional segment may include null MPEG packets, or an effect, such as a fade to black. The PCR values of the gap filling segment are revised in a similar fashion as explained above to avoid a discontinuity between the advertisement A and the additional segment. When more than one advertisement is included, the PCR values of the additional segments are revised as described for the gap filling segment.

For ease of illustration, only two packets of the advertisement A are shown, and furthermore, for ease of illustration only those packets with a set PCR bit (fields 18A and 18B) are shown. Although an example of splicing a video segment with normalized PCR values is shown, it should be understood that values of other non-normalized streams can be revised by determining a difference between the value X and the initial PCR value of the advertisement A, and then adjusting the PCR values included in the advertisement A by that determined difference.

Since the spliced encoded video stream 11B now has a continuous sequence of PCR values, no discontinuity bits are set in the discontinuity fields 19A and 19B. In other words, the discontinuity bits of all packets included in the spliced encoded stream 11B are set to zero. Accordingly, decoders such as the Motorola DCT 2000 do not display a vertical roll when decoding the stream 11B. Moreover, the continuous sequence of PCR values is achieved without re-encoding the content or the advertisement A.

For some transport stream protocols, the above described revision may complete the reformatting process. However, for the MPEG protocol further revisions to the PTS and DTS values are preferred for preventing a horizontal shake from being caused by the above described revision. The further revision to the timing values is described with reference to FIG. 2B.

Figure 2B:
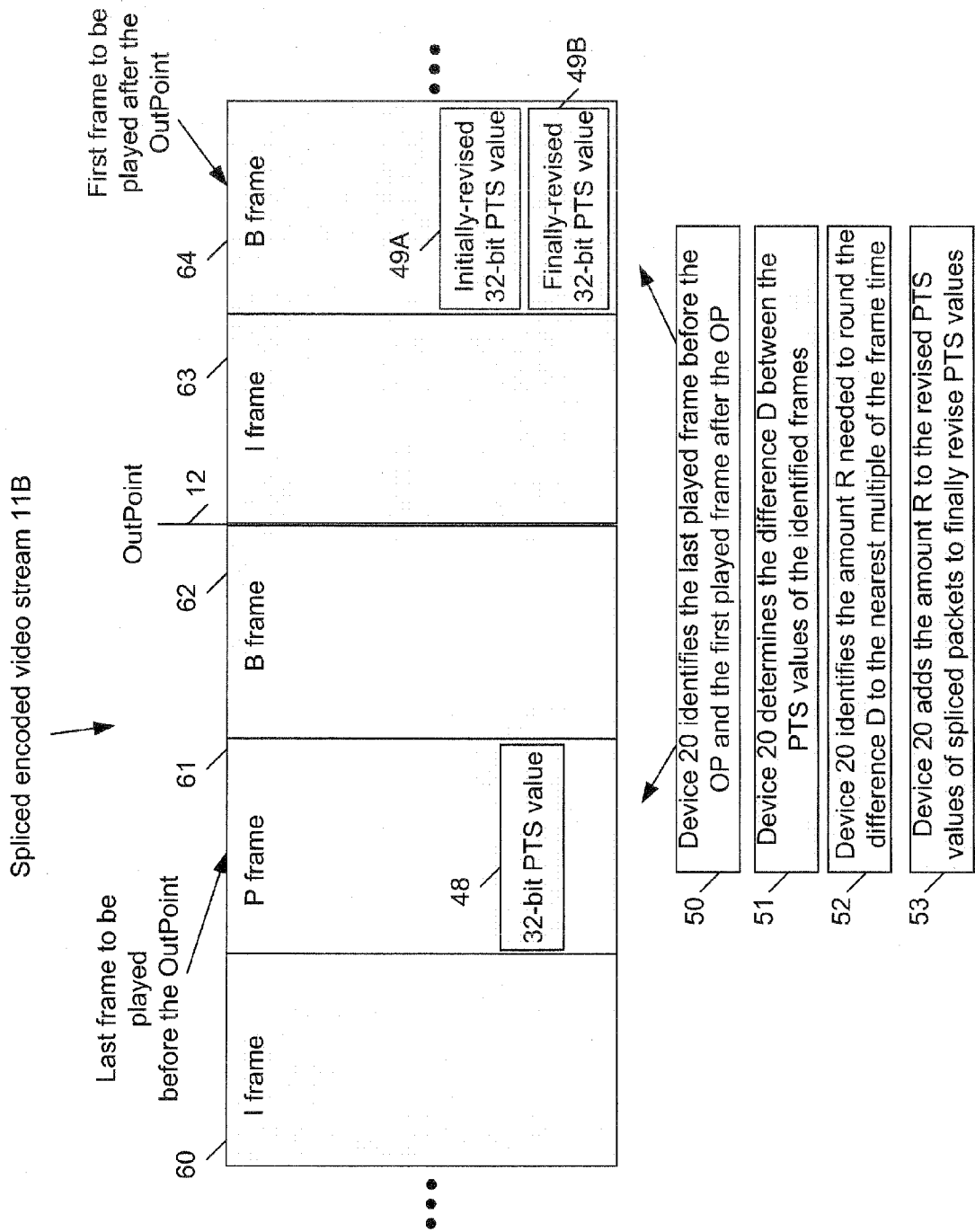
FIG. 2B illustrates another example of how the network device shown in FIG. 1 revises timing values to improve splice transitions.

FIG. 2B illustrates another example of how the network device shown in FIG. 1 revises timing values to improve splice transitions.

The MPEG specification also defines other 90 kHz based timing values including the Presentation Time Stamp (PTS) and Decode Time Stamp (DTS). According to the MPEG specification, an encoder stamps encoded packets with DTS values to indicate the instant for the decoder to remove the packet from the receiver buffer and instantaneously decode the packet. The PTS values indicate that instant that the decoded picture should be presented for play out. Since the MPEG specification assumes decoding is instantaneous, the PTS and DTS values are only different for B frames (not I or P frames).

The revisions to the PTS and DTS values described with reference to FIG. 2A can cause a decoder to display a horizontal shake during play out of the advertisement A for reasons that are outside the scope of the present specification. A horizontal shake is when the picture displaces horizontally, but is otherwise similar to the vertical roll. It has been observed that some decoders, notably the aforementioned Motorola DCT 2000, exhibit a horizontal shake if a PCR stream is continuous but the PTS and DTS values across the splice are not multiples of the frame time, which, for MPEG-2 NTSC streams, is three thousand and three counts of the 90 kHz clock. The horizontal shake can be corrected for using the revision process described with reference to FIG. 2B.

In block 50, the device 20 identifies the last frame 61 played before the OutPoint 12. The last played frame is not necessarily last frame in the stream, which is illustrated in FIG. 2 showing other content frames 60 and 62. Similarly, the device 20 identifies the first frame 64 to be played after the OutPoint 12, which in this example is not the immediately adjacent frame 63. In block 51, the device compares the PTS values 48 and 49A of the identified frames 61 and 64 to identify the difference D.

In block 52, the device 20 identifies an amount R needed to round the difference D to the nearest multiple of the frame time, which, for MPEG-2 NTSC streams, is three thousand and three counts of the 90-Hz clock (note that the frame time for MPEG-2 PAL streams is three thousand and six hundred counts). The amount R should be no greater than one half the frame time, thus amount R is a positive or negative amount needed to round the difference D to the nearest multiple of the frame time. Once the amount R is identified, in block 53 the amount R is added to the initially revised PTS values of all packets in the advertisement A; including the initially revised PTS value 49A of the frame 64. As a result, the finally revised PTS value 49B of the frame 64 is a multiple of three thousand and three 90 kHz clock later than the PTS value 48 of frame 61. The DTS values are finally revised in a similar fashion to address the horizontal shake.

As a result of the revisions described with reference to FIGS. 2A and 2B, the encoded spliced stream 11B plays without the vertical roll and without the horizontal shake. Moreover, the content received by the device 20 was not decoded/re-encoded, reducing the consumption of processing resources and maintaining security for the content provider.

For ease of explanation, the revisions to the PTS and DTS timing values were described as occurring in a sequential fashion, e.g. initially the value X/300 is added to all PTS and DTS values and then subsequently the amount R is added to the initially revised PTS and DTS values. However, it should be apparent that in other examples a single process revises the PTS and DTS values according to both the determined values X and R.

It should be apparent that the terminology "revising the timing values" or "reformatting the timing values" encompasses editing the original data and/or adding new headers to a spliced stream. Adding new headers to avoid editing the original data may reduce memory utilization, particularly if the same content is being streamed to multiple users with different advertisements.

Although the above described embodiment is described with respect to splicing an advertisement in an MPEG encoded stream, it should be apparent that other embodiments splice any content into any stream that is encoded using a compression protocol. The timing values in the present example include PCR, PTS and DTS values; however, in other examples other timing values may be revised according to the principles described herein.

The network device 20 can be referred to as a midpoint because it is logically located between an encoder and a decoder. It should be apparent that the network device 20 may be located in close physical proximity to the encoder and/or the decoder.

In some examples, the segment to be inserted may be pre-processed to avoid on-the fly revisions to the timing values. In such examples, at the time the encoded segment is received by the network device 20, the network device 20 normalizes timing values included therein to correspond with known availability points in content streams.

FIG. 3 illustrates an example capability table that may be used by the network device shown in FIG. 1 to select which output streams are restamped.

The capability table 70 may be stored on the network device 20 or stored remotely. The capability table 70 includes a column 71 listing decoders that are known to display a vertical roll upon receiving a packet having a discontinuity bit set. Other columns 72, 73, and 74 include other information that may be used to identify the listed decoders. The columns 71-74 are examples, other examples of the table 70 can include other columns containing other information that can be used to distinguish decoders.

The device 20 may use the capability table 70 to minimize reformatting, which may reduce power consumption and free up hardware resources for other tasks. For example, the device 20 may receive a request from a destination to send spliced content to the destination, such as a cable subscriber. The device 20 then determines information about the decoder used by the destination, for example by analyzing the request to determine information about the decoder. If the information is not included in the request, the device 20 may exchange signaling with the decoder or access a database that correlates destinations with decoder information. The obtained information may be only limited information about the decoders used at the destination, such as only their hardware configuration; however, even this limited information may be sufficient for comparison with the table 70. According to comparison with the table 70, the device 20 determines whether to send the spliced content with revised timing values.

In other examples, the capability table 70 could instead list only decoders known to handle discontinuity bits without displaying a vertical roll. In such other examples, the device 20 revises timing values in a spliced encoded stream only when the destination includes at least one decoder that is not included in the capability table 70.

In yet other examples, the capability table 70 could include an additional column (not shown) indicating which types of streams receive revised timing values. This would allow the device 20 to skip the aforementioned process for particular streams that cannot even be played out by the DCT 2000, such as High Definition (HD) content, PAL content, or AVC content, but utilize the aforementioned process for streams that can be played out by the decoder, such as NTSC standard definition MPEG-2 streams. Such a further optimization may result in even greater processor utilization efficiency.

In still yet other examples, the capability table 70 could include an additional column (not shown) indicating certain streams for which decoding and re-encoding should be used during splicing instead of timing value revisions. For example, an additional column can indicate whether the stream supports trick mode operations, such as rewind, pause, fast-forward. Then, in order to preserve such functionality, decoding and re-encoding can be used to splice those streams. Accordingly, time value revisions is used for some streams to reduce processor utilization, while decoding and re-encoding is used for other more fully featured streams. In such a case, the timing values would increment no matter what a user at a decoding endpoint was doing, whether playing the stream, rewinding, pausing, playing an add, etc.

It should be apparent that the capability table 70 is optional. In some examples, the device 20 revises timing values in every output stream. This may be preferable when information about the decoder is unavailable, or difficult to acquire.

Figure 4:
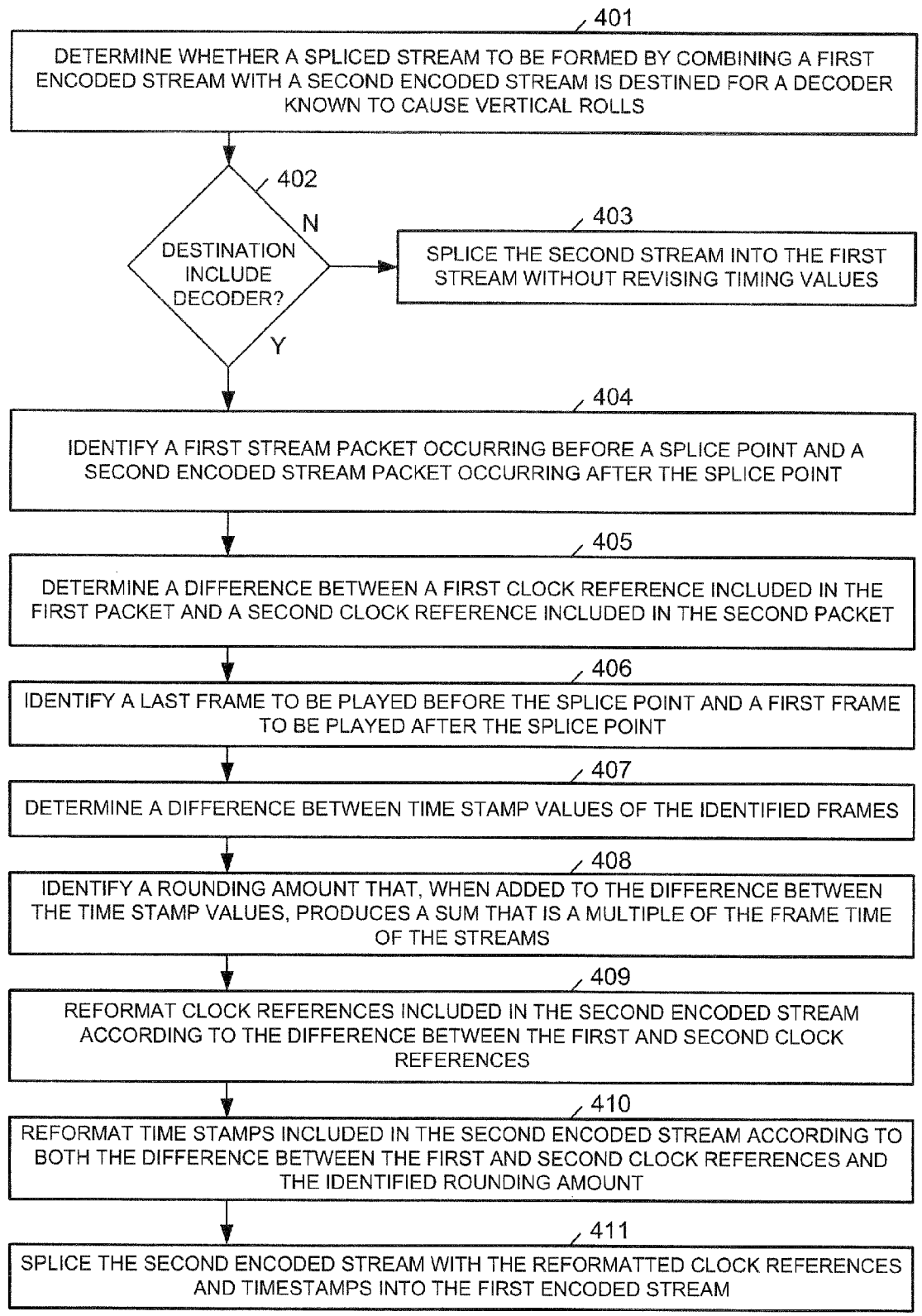
FIG. 4 illustrates an example method for using the network device illustrated in FIG. 1.

FIG. 4 illustrates an example method for using the network device illustrated in FIG. 1.

In block 401, the network device 20 determines whether a spliced stream to be formed by combining a first encoded stream and a second encoded stream is destined for a decoder known to cause vertical rolls. This determination is optional and in other examples the network device may skip this determination. If the destination does not include the decoder in decision box 402, the network device 20 splices the second stream into the first stream without revising timing values in block 403.

If the destination does include the decoder in decision box 402, in block 404 the network device 20 identifies a first stream packet occurring before a splice point and a second encoded stream packet occurring after the splice point. In block 405, the network device 20 determines a difference between a first clock reference included in the first packet and a second clock reference included in the second packet.

In block 406, the network device 20 identifies a last frame to be played before the splice point and a first frame to be played after the splice point. The network device 20 determines a difference between time stamp values of the identified frames in block 407. In block 408, the network device 20 identifies a rounding amount that, when added to the difference between the time stamp values, produces a sum that is a multiple of the frame time of the streams. The rounding amount can be a positive or negative number.

In block 409, the network devices 20 reformats clock references included in the second encoded stream according to the difference between the first and second clock reference values. The network device 20 also reformats time stamps included in the second encoded stream according to both the difference between the first and second clock references and the identified rounding amount in block 410. In block 411, the network device 20 splices the second encoded stream with the reformatted clock references and timestamps into the first encoded stream.

Several examples have been described in which a relatively short advertisement is spliced into a relatively long base encoded segment of content. As described above, in these examples the timing values of the packets in the segment to be spliced are revised while the timing values of the packets in the base encoded segment are not changed. However, in other splicing examples, the spliced segment may include more packets than the base segment. In these instances, system resources are optimized by the device 20 revising the timing values of the base encoded segment to be continuous with the spliced segment because the base segment has fewer packets to revise. If the spliced segment is normalized, then the base segment may be revised to end with, for example, a PCR with all 42 bits set to one just before the splice point such that the normalized segment to be spliced is continuous when starting at a zero PCR count. The device 20 may even be configured to determine which stream has fewer packets, and then revise the timing values of packets in that stream.

Several examples have been described above with reference to the accompanying drawings. Various other examples of the invention are also possible and practical. The system may be exemplified in many different forms and should not be construed as being limited to the examples set forth above. For example, although the present example was described with reference to MPEG, it should be apparent that the principles described herein can also be applied to other standards such as Advanced Video Coding (AVC), VC-1, or Audio Video Standard (AVS).

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. An apparatus comprising:
    circuitry to analyze both a first encoded stream to identify a first packet occurring before a splice point and the second encoded stream to identify a second packet occurring after the splice point;
    circuitry to identify both a first timing value included in the first packet and a second timing value included in the second packet;
    circuitry to determine a difference between the timing values;
    circuitry to revise timing values included in packets within one of the streams, said revision according to the determined difference;
    circuitry to splice the second encoded stream into the first encoded stream;
    wherein the apparatus is operable to operate as a midpoint between an encoder and a decoder, the apparatus to receive the first encoded stream from the encoder, to splice the second encoded stream into the first encoded stream, and to send the spliced encoded first stream to the decoder;
    wherein the apparatus is operable to splice the second stream into the first stream independently of whether any processing resources are available to decode and re-encode the first encoded stream; and
    wherein the second encoded stream is spliced into the first encoded stream without setting any discontinuity bits in any packets included in the streams; and
    wherein the first encoded stream is encoded according to a Moving Picture Experts Group (MPEG) protocol and the circuitry is further operable to:
    analyze both the first encoded stream to identify a last frame to be played before the splice point and the second encoded stream to identify a first frame to played after the splice point;
    identify both a first presentation time stamp included in the last frame and a second presentation time stamp included in the first frame;
    determine a delta between the presentation time stamps, the delta representation number of 90 kHz counts between the presentation time stamps;
    identify an amount needed to round the delta to the nearest multiple of three thousand and three 90 kHz counts, the identified amount being no greater than half of the frame time for the streams; and
    adjust presentation time stamps included in packets of one of the streams according to both the identified amount and the determined difference.

2. The apparatus of claim 1 wherein adjusting the presentation time stamps includes dividing the determined difference by three hundred.

3. A system comprising:
a processing device; and
a memory coupled to the processing device, the memory storing instructions that, if executed by the processing device, are operable to:
  analyze both a first encoded stream to identify a first packet occurring before an outpoint and a second encoded stream to identify a second packet occurring after the outpoint;
  identify both a first timing value included in the first packet and a second timing value included in the second packet;
  determine a difference between the timing values;
  reformat timing values included in packets within one of the encoded streams relative to timing values included in packets of the other stream, said reformatting according to the determined difference;
  combine the second encoded stream and the first encoded stream;
  analyze both the first encoded stream to identify a last frame to be played before the outpoint and the second encoded stream to identify a first frame to played after the outpoint;
  identify both a first presentation time stamp included in the last frame and a second presentation time stamp included in the first frame;
  determine a delta between the presentation time stamps;
  identify an amount that, when added to the delta, produces a sum that is a multiple of the frame time of the streams; and
  reformat presentation time stamps included in packets of one of the encoded steams according to at least the identified amount.

4. The system of claim 3 wherein the instructions, if executed, are further operable to:
  determine whether a destination for the encoded first stream includes a decoder known to cause a vertical roll to be displayed in response to processing an encoded packet having a discontinuity bit set.

5. The system of claim 3 wherein the reformatting is to packets included in a selected one of the encoded streams that has fewer total packets than the remaining encoded stream.

6. The system of claim 3 wherein the streams are combined independently of whether processing resources are available for decoding.

7. A method comprising:
  analyzing both a first encoded stream to identify a first packet occurring before an outpoint and a second encoded stream to identify a second packet occurring after the outpoint;
  identifying both a first timing value included in the first packet and a second timing value included in the second packet;
  determining a difference between the timing values;
  reformatting timing values included in packets within one of the encoded streams relative to timing values included in packets of the other streams, said reformatting according to the determined difference;
  combining the second encoded stream and the first encoded stream;
  analyzing both the first encoded stream to identify a last frame to be played before the outpoint and the second encoded stream to identify a first frame to played after the outpoint;
  identifying both a first time stamp included in the last frame and a second time stamp included in the first frame;
  determining a delta between the time stamps;
  identifying an amount that, when added to the delta, produces a sum that is a multiple of the frame time of the streams; and
  reformatting time stamps included in packets of one of the encoded steams according to the determined difference and the identified amount.

8. The method of claim 7 further comprising setting all discontinuity bits of the combined stream to zero.

9. The method of claim 7 further comprising:
  receiving a request for content for at least one decoder;
  determining hardware capabilities of the at least one decoder; and
  reformatting the timing values and the time stamps according to the hardware capability determination.

10. The method of claim 7 further comprising:
  determining which of the encoded streams includes fewer packets; and
  revising the timing values of the packets included in the encoded stream having fewer packets.

11. The method of claim 7 wherein the streams are combined by a midpoint located remotely from both an encoder for at least one of the streams and a decoder for the combined stream.

12. The method of claim 7 further comprising:
  identifying a third encoded stream to be combined with the first and second encoded streams to fill a remaining gap in an advertisement availability segment; and
  reformatting timing values in the third encoded stream before combining the encoded streams.

13. The method of claim 7 wherein the first encoded stream is encoded according to one of the Advanced Video Coding (AVC), VC-1, or Audio Video Standard (AVS) standards.

* * * * *